(12) United States Patent
Ohtsubo et al.

(10) Patent No.: US 7,107,404 B2
(45) Date of Patent: Sep. 12, 2006

(54) METHOD AND SYSTEM FOR DATA PROCESSING FOR CONTROLLING A CACHE MEMORY

(75) Inventors: Kouichi Ohtsubo, Yokohama (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 23 days.

(21) Appl. No.: 10/932,107

(22) Filed: Sep. 2, 2004

(65) Prior Publication Data

US 2005/0278482 A1 Dec. 15, 2005

(30) Foreign Application Priority Data

Jun. 10, 2004 (JP) .............................. 2004-172001

(51) Int. Cl.
*G06F 12/02* (2006.01)
(52) U.S. Cl. ..................... 711/130; 711/129; 711/165
(58) Field of Classification Search ..................... None
See application file for complete search history.

(56) References Cited

U.S. PATENT DOCUMENTS

| | | | |
|---|---|---|---|
| 5,678,026 A | 10/1997 | Vartti et al. | |
| 5,983,324 A | 11/1999 | Ukai et al. | |
| 6,009,498 A | 12/1999 | Kumasawa et al. | |
| 6,813,684 B1 * | 11/2004 | Sakaguchi et al. | 711/113 |
| 2002/0046321 A1 * | 4/2002 | Kanai et al. | 711/113 |
| 2003/0023808 A1 * | 1/2003 | Bakke et al. | 711/113 |
| 2003/0212855 A1 | 11/2003 | Sakaguchi et al. | |
| 2005/0097402 A1 | 5/2005 | Baba | |
| 2005/0223173 A1 * | 10/2005 | Yamazaki | 711/128 |
| 2005/0251625 A1 * | 11/2005 | Nagae et al. | 711/129 |

FOREIGN PATENT DOCUMENTS

| | | |
|---|---|---|
| JP | 03-266046 | 11/1991 |
| JP | A-3-266046 | 11/1991 |

OTHER PUBLICATIONS

"Network Caching Technologies," Internet Technology Overview, Jun. 1999, pp. 49-1 to 49-8.

* cited by examiner

*Primary Examiner*—Reginald G. Bragdon
*Assistant Examiner*—Daniel Ko
(74) *Attorney, Agent, or Firm*—Antonelli, Terry, Stout and Kraus, LLP.

(57) ABSTRACT

A data processing system comprising a storage apparatus and computers which executes a first program and a second program, the storage apparatus having a cache memory with a first area and a second area and a disk unit for storing data of the cache memory. The storage apparatus writes data into the first area corresponding to area identification information included in a data storage request in response to an input of the data storage request. The data is written into the second area corresponding to area identification information included in a data storage request in response to an input of the data storage request. The data stored in the second area is copied to the first area in response to an input of a copy request for causing the data in the second area to be reflected in the first area.

14 Claims, 18 Drawing Sheets

→ : DATA FLOW

→ : DATA FLOW

→ : DATA FLOW

→ : DATA FLOW

→ : DATA FLOW

FLUSH COMMAND

METHOD AND SYSTEM FOR DATA PROCESSING FOR CONTROLLING A CACHE MEMORY

INCORPORATION BY REFERENCE

The present application claims priority from Japanese application JP2004-172001 filed on Jun. 10, 2004, the content of which is hereby incorporated by reference into this application.

BACKGROUND OF THE INVENTION

The present invention relates to a cache control method for a storage system, and more particularly to an effective caching control technology that is responsive to an access from a computer or a program.

Conventionally, when using the same file (logical block address) in computers or programs performing different works, an exclusive control in which a shared file is exclusively used has been performed to prevent an occurrence of a logical inconsistency. According to this technology, other programs are inhibited to access the file until an end of execution of processing such as data updating request made by a specific computer or program for the file. Accordingly, there is a method of duplicating the file and using the files with switching between a reference file and an update file alternately as disclosed in JP-A-3-266046.

SUMMARY OF THE INVENTION

While the method eliminates a conflict between the reference and the update, the number of inputs or outputs increases to the order of twice in total due to copy processing from the update file to the reference file. Furthermore, during the copy processing from the update file to the reference file, it is highly possible that an access to the reference file is inhibited, thereby deteriorating response of a program accessing the reference file. Still further, the updated file data affects storage cache information, thereby deteriorating response of other programs.

Therefore, it is an object of the present invention to control a cache of a storage system from a computer to update data concurrently with referencing data. Furthermore, it is another object of the invention to reserve or release a cache with appending an identification number to the cache of the storage system from the computer. It is still another object of the invention to control writing from the cache of the storage system to a drive from the computer. It is a further object of the invention to control the storage system with a command to which an identification number is appended. It is a still further object of the invention to provide a storage system for controlling caches by the identification number.

According to the present invention, the storage system performs the copy processing from the update file to the reference file, thereby reducing accesses to the storage system.

DETAILED DESCRIPTION OF THE EMBODIMENTS

The preferred embodiments of the present invention will now be described in detail hereinafter with reference to the accompanying drawings.

Figure 1:
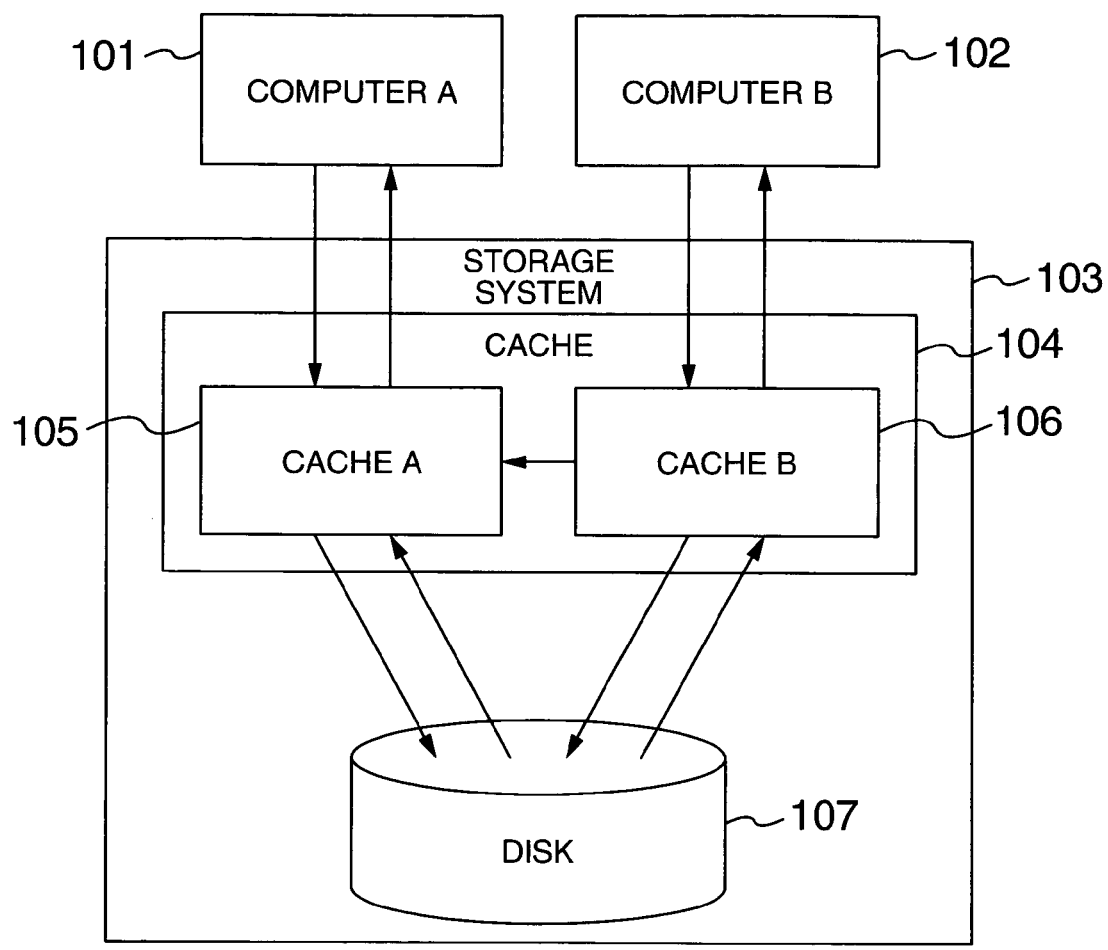
FIG. 1 is a configuration of the present invention.

Referring to FIG. 1, there is shown a diagram of a configuration of an embodiment of the present invention. Computers 101 and 102 control a storage system 103 to reference and update data. A disk 107 is an apparatus for storing data and is provided with a cache 104 since it operates at a low speed. The cache 104 is divided into a cache 105 for a computer 101 and a cache 106 for a computer 102 for a control.

When the computer 101 references data and if the cache 104 contains the same data as in the disk 107, the data is sent back from the cache 104 to the computer 101. Unless the data is stored in the cache 104, it is read from the disk 107 and sent back to the computer 101 and then stored in the cache 105. If the computer 102 updates data, the updated data is stored in the cache 106 and the computer 102 makes a control as to whether the data stored in the cache 106 should be stored into the disk 107 or the updated data in the cache 106 is invalidated. If data having the same address as for the updated data is already stored in the cache 105 when the updated data in the cache 106 is stored into the disk 107, the data having the same address in the cache 105 is invalidated, so that the updated data in the cache 106 is reflected in the cache 105. If the updated data stored in the cache 106 is invalidated, it is only necessary to invalidate the updated data in the cache 106.

Figure 2:
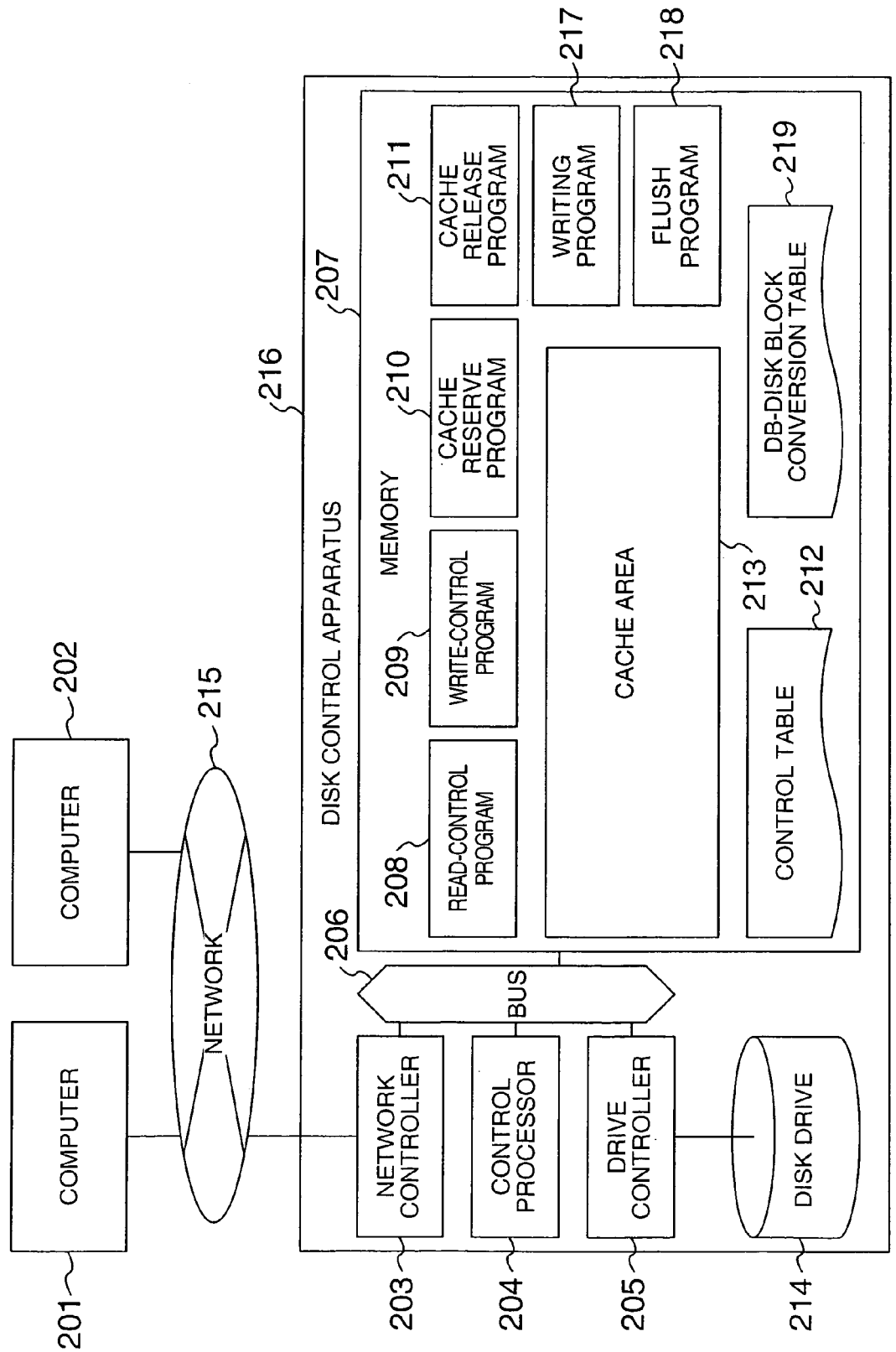
FIG. 2 is a general configuration of a storage system of the present invention.

Referring to FIG. 2, there is shown a general configuration of a storage system to which a cache control method according to the present invention is applied. There are shown computers 201, 202 and a disk control apparatus 216. A disk drive 214 is connected to the disk control apparatus 216. The computers 201, 202 and the disk control apparatus 216 are connected to a network 215. If an I/O request command is issued from the computer 201 to the disk control apparatus 216, the disk control apparatus 216 interprets the I/O request command and makes input or output to or from the drive 214.

The disk control apparatus 216, in further detail, comprises a network controller 203, a control processor 204, a memory 207, a drive controller 205, and a bus 206 connecting them. The network controller 203 performs control processing such as accepting an I/O command issued from the computers 201, 202 or informing the computers 201, 202 of an end of the processing and data. The drive controller 205 performs a data I/O control for a connection of the drive 214. The network controller 203 and the drive controller 205 are enabled or disabled by the control processor 204 and a data transfer instruction is issued for the operation. Operations of the control processor 204 are described in a program or a table stored in the memory 207.

A read-control program 208 controls an input request issued from the computers 201, 202 and a write-control program 209 controls an output request issued from the computers 201, 202 as a control program. A cache reserve program 210 allocates a cache area 213 for storing data. A cache release program 211 releases the cache area 213 reserved by the cache reserve program 210. A writing program 217 is for use in replacing a content of the cache area 213 or in writing it to the drive periodically. A flush program 218 is for use in making an instruction of writing data in the cache area to the drive. A control table 212 contains information on the cache area 213.

The cache area is for use in temporarily storing data read from the drive 214. If there is a request for reading the same data from the computers 201, 202 again, the data can be rapidly sent back from the cache area 213 to the computers 201, 202. If there is a write request issued from the computers 201, 202, the cache area 213 is used for temporarily retaining written data therein. A completion of writing is reported to the computers 201, 202 when the data has been written into the cache area 213, and therefore it is possible to make the write processing look as if it were rapidly performed. Data is written into the drive 214 with a write control activated when data is replaced from the cache area 213, at every periodic time (at predetermined time intervals), or on the basis of a cache replacement algorithm such as a least recently used algorithm (LRU). The respective processing units and programs can be practiced by hardware. It is also possible to use virtual machines, logical servers, or logic machines, as the computers described in this embodiment. The processing units and programs can be put to practical use by programs, objects, processes, and threads.

Figure 3:
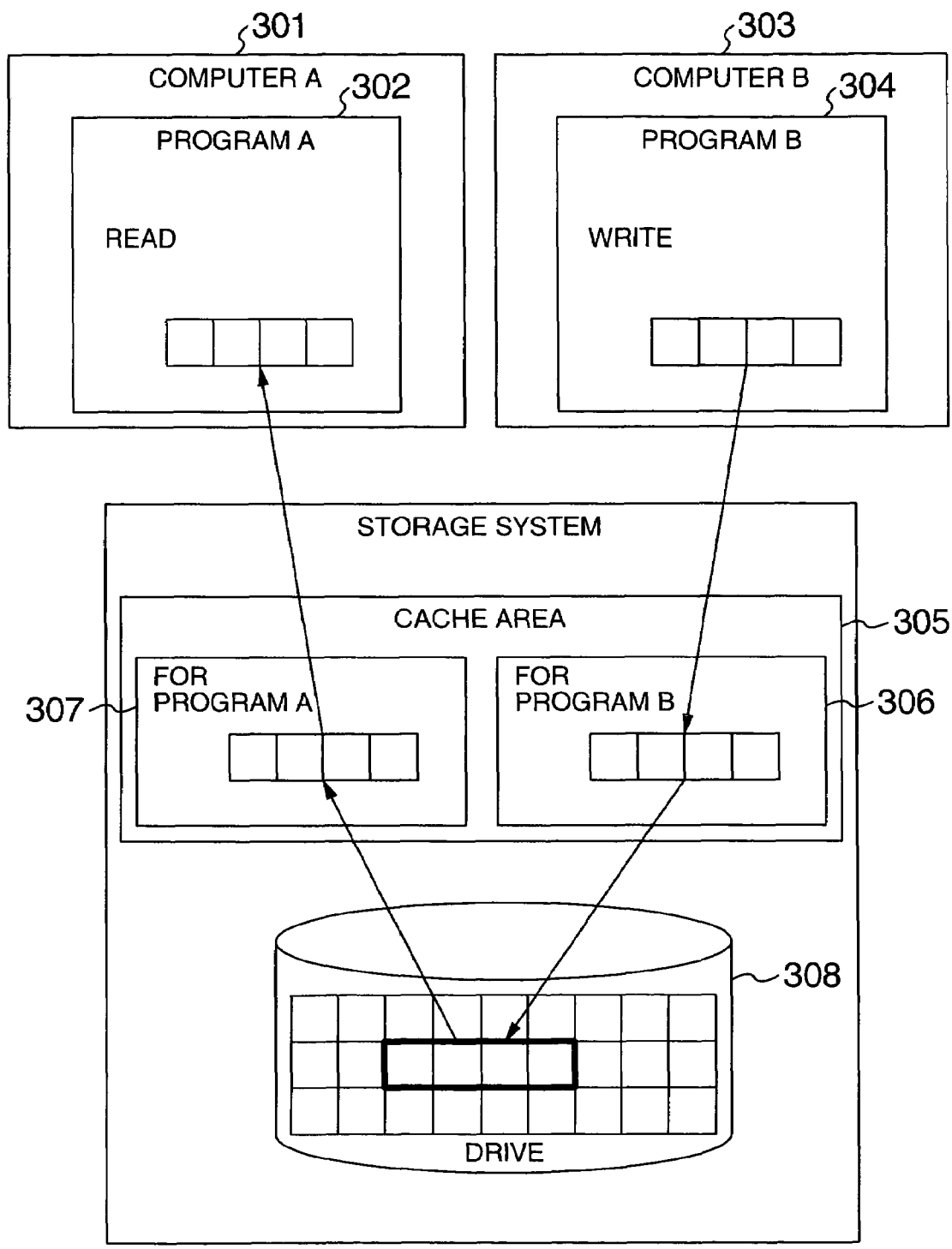
FIG. 3 is an operation regarding a cache area.

Referring to FIG. 3, there is shown a basic operation in a cache area 305. It shows a condition where a program A (302) in a computer 301 and a program B (304) in a computer 303 are booted. In the cache area 305, a cache area 307 for the program A responsive to a request from the program A (302) and a cache area 306 for the program B responsive to a request from the program B (304) are reserved as shown.

Unless data requested by the program A (302) is stored in the cache area 305, the data is read from the drive 307, stored into the cache area 308 for the program A, and then transferred to the program A. Written data requested by the program B (304) is stored into the cache area 306 for the program B. The data stored into the cache area 306 for the program B is written into the drive 308 according to an instruction of the program B (304) or the data written into the cache area 306 for the program B is invalidated.

Figure 4:
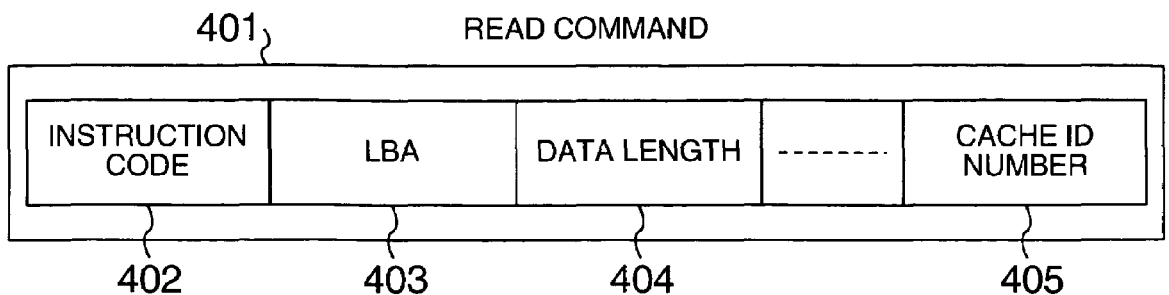
FIG. 4 is a read command structure.
Figure 5:
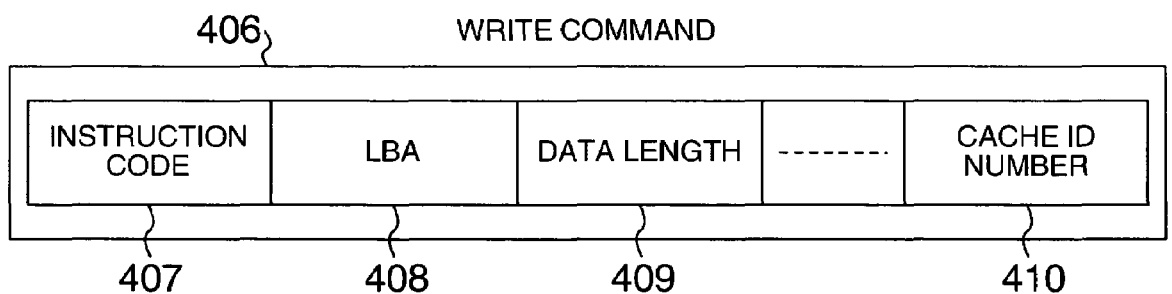
FIG. 5 is a write command structure.
Figure 6:
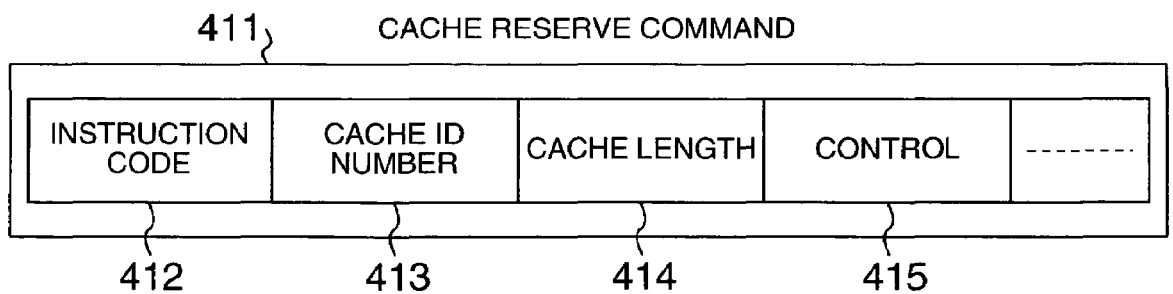
FIG. 6 is a cache reserve command structure.
Figure 7:
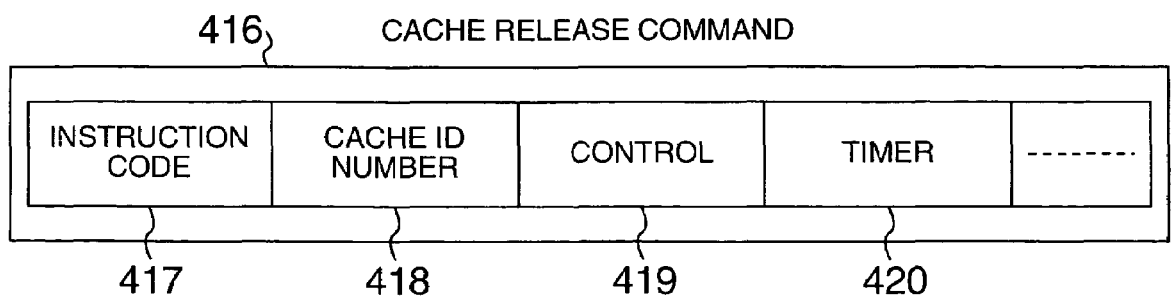
FIG. 7 is a cache release command structure.
Figure 24:
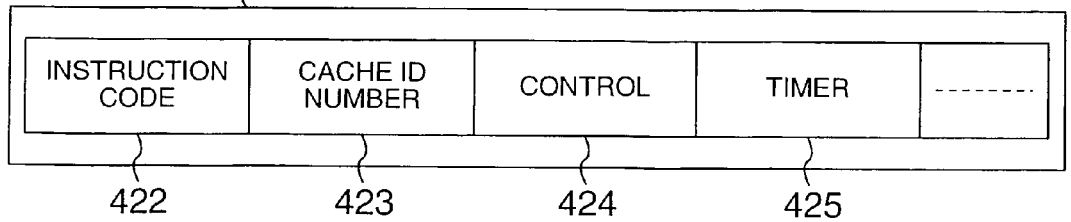
FIG. 24 is a flush command structure.

Referring to FIGS. 4 to 7 and FIG. 24, there are shown examples of I/O commands for controlling the disk control apparatus. A command 401 in FIG. 4 is for use in reading data from the storage system. A command 406 in FIG. 5 is for use in writing data into the storage system. A command 411 in FIG. 6 is for use in reserving a cache of the storage system. A command 416 in FIG. 7 is for use in releasing the cache of the storage system. A command 421 in FIG. 24 is for use in giving an instruction of writing data held in the cache into the drive.

The command 401 comprises an instruction code 402, a logical block address (LBA) 403, a data length 404, and an identification number 405. The command 406 comprises an instruction code 407, a LBA 408, a data length 409, an identification number 410. The command 411 comprises an instruction code 412, a cache identification number 413, a cache length 414, and a control 415. The command 416 comprises an instruction code 417, a cache identification number 418, a control 419, and a timer 420. The command 421 comprises an instruction code 422, a cache identification number 423, a control 424, and a timer 425. The instruction codes 402, 407, 412, 417, and 422 are read, write, cache reserve, cache release, and flush codes, respectively. The LBAs 403, 408 indicate locations of data in the drive. The data lengths 404, 409 indicate I/O data lengths. The cache identification numbers 405, 410, 413, 418, and 423 indicate information for identifying caches to be used.

The cache length 414 indicates a cache length of a cache to be reserved. The control 415 indicates control information of a cache to be reserved. With this information, data written by the command 406 can be held in the cache until a further instruction is given. The control 419 of the command 416 and the control 424 of the command 421 indicate whether updated data having been held should be reflected in the drive at a cache release and at flushing, respectively. The timers 420, 425 specify delayed times of the cache release and flushing, respectively. By specifying the timers, the updated data held in the cache can be reflected in the drive rapidly at a specified time. The updated data can also be invalidated at the specified time without being reflected in the drive. It has the same meaning as for resuming the content of the drive at the specified time.

Figure 8:
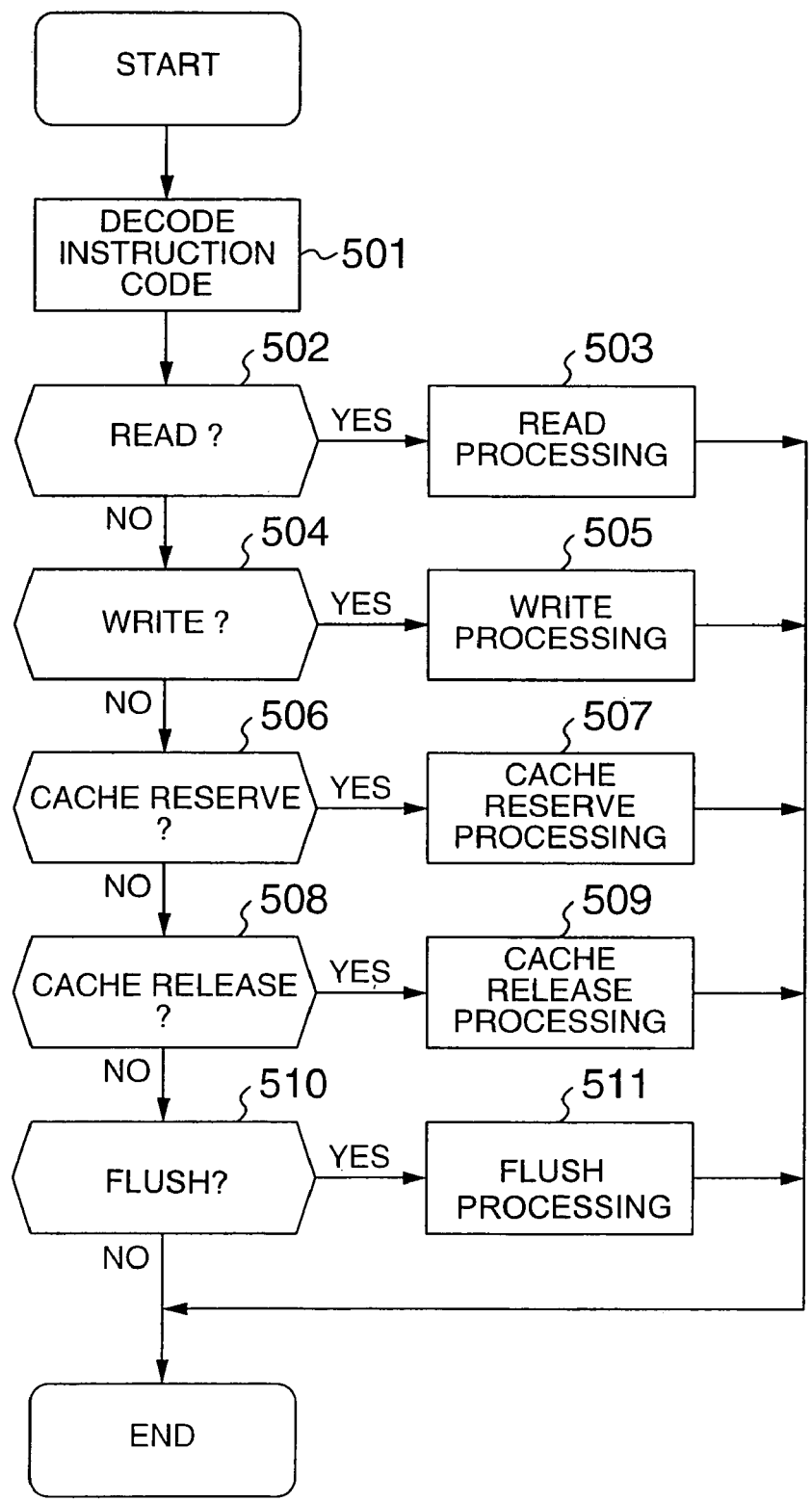
FIG. 8 is an analysis flow of an instruction code.

Referring to FIG. 8, there is shown a flow of processing performed when the disk control apparatus has received an instruction code. In instruction code decoding process 501, the accepted command is decoded to take the meaning of the instruction. In step 502, it is determined whether the instruction code is for a read request. In read processing 503, data is read out by performing data read processing of the flow shown in FIG. 11. In step 504, it is determined whether the instruction code is for a write request. In write processing 505, data is written by performing write processing of the flow shown in FIG. 15. In step 506, it is determined whether the instruction code is for a cache reserve.

Figure 10:
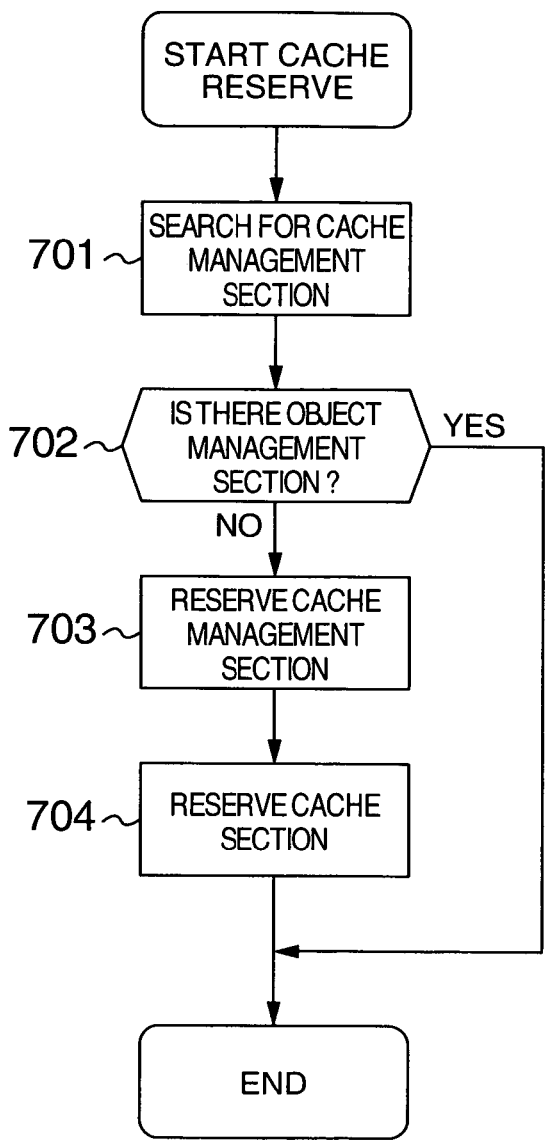
FIG. 10 is a cache reserve processing flow.

In cache reserve processing 507, there is performed cache reserve processing for each identification number of the flow shown in FIG. 10, using the cache area and the control table shown in FIG. 2. In step 508, it is determined whether the instruction code is for a cache release. In cache release processing 509, there is performed cache release processing allocated for each identification number of the flow shown in FIG. 19 or FIG. 20. In step 510, it is checked that the instruction code is for a flush. In flush processing 511, there is performed data flush processing of the flow shown in FIG. 22.

Figure 9:
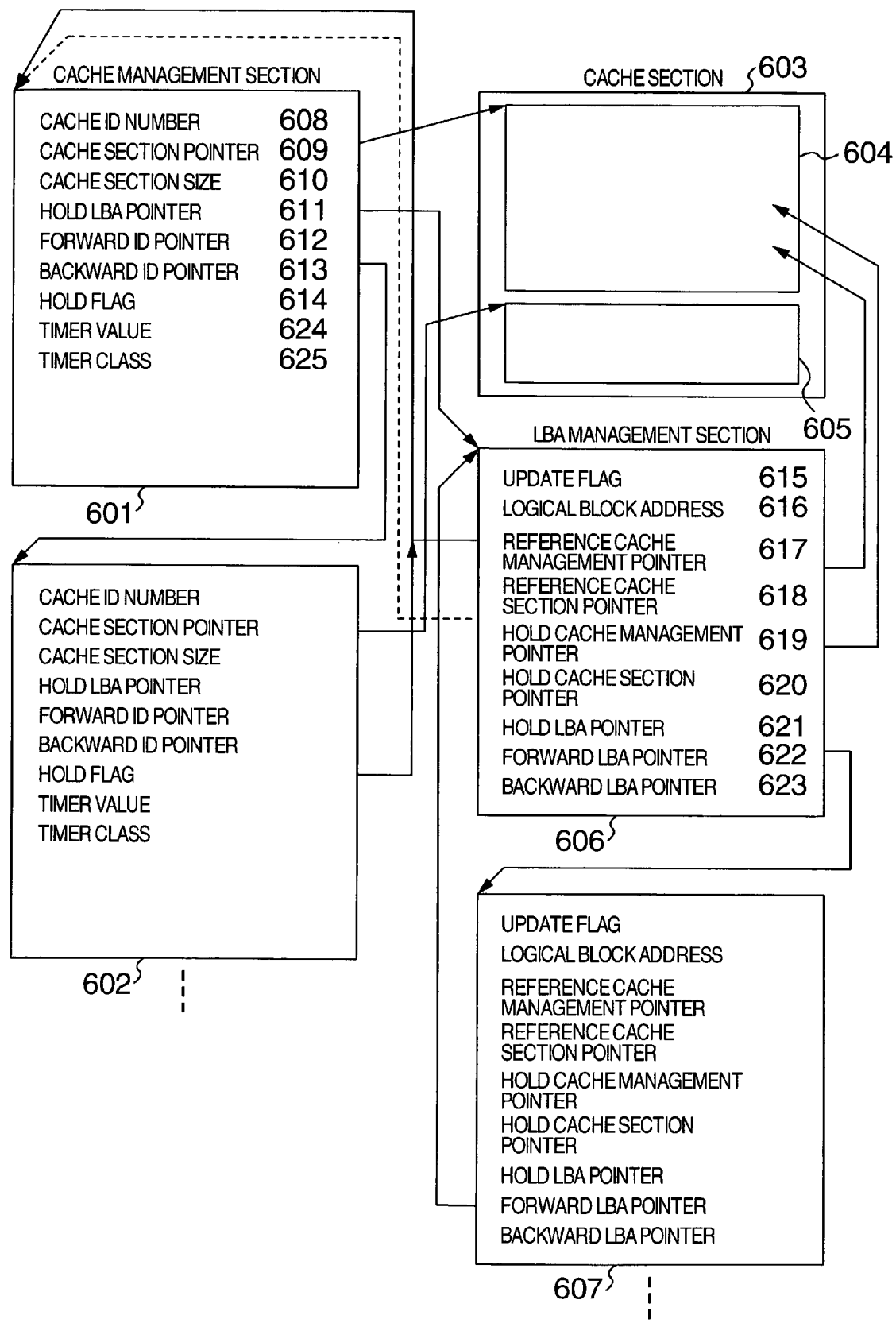
FIG. 9 is a control table structure.

Referring to FIG. 9, there is shown a structure of the control table in FIG. 2. Cache management sections 601, 602 are control tables corresponding to the identification numbers shown in FIG. 4. The cache management sections 601, 602 manage cache sections 604, 605 allocated to each identification number from a cache section 603. Each of the cache management sections 601, 602 comprises a cache management identification number 608, a cache section pointer 609, a cache section size 610, a hold LBA pointer 611, a forward identification number pointer 612, a backward identification number pointer 613, a hold flag 614, a timer value 624, and a timer class 625. The reference numerals 608 to 614, 624, and 625 are units of management for each identification number.

The cache identification number 608 is information for identifying an area of an allocated cache section. The cache section pointer 609 and the cache section size 610 correspond to areas for storing the pointer and the size of the allocated cache area. The timer value 624 and the timer class 625 correspond to areas for storing the time when the cache release or flush processing is performed and the timer class. The hold flag 614 indicates whether write processing into the drive should be withheld until the computer gives an instruction at the time of writing data and corresponds to an area for storing a pointer to the LBA management section holding it with the hold LBA pointer 611. The forward identification number pointer and the backward identification number pointer are for use in connecting the cache management sections and they need be changed at an occurrence of deleting or registering a cache management section.

The LBA management sections 606, 607 are for use in managing the cache sections where data is stored. The LBA management section comprises an update flag 615, a logical block address 616, a reference cache management pointer 617, a reference cache section pointer 618, a hold cache management pointer 619, a hold cache section pointer 620, a hold LBA pointer 621, a forward LBA pointer 622, and a backward LBA pointer 623. The logical block address 612 is an area for storing a logical block address of data under management. The reference cache section pointer 618 and the reference cache management pointer 617 are set for a cache storing data read from the drive and data to be written into the drive. The reference cache management pointer 617 is set for the cache management section managing the cache section of the reference cache section pointer 618. Hereinafter, the cache section managed by the reference cache section pointer and the reference cache management pointer is referred to as a reference cache. The update flag 615 corresponds to an area for indicating that the reference cache need be written into the drive. With the setting of this reference flag, data is written from the cache into the drive at the time of flush or cache release processing or by the writing program executed at predetermined time intervals.

The hold cache section pointer 620 corresponds to an area for storing a pointer to the cache section holding information to be written into the drive. The hold cache management pointer 619 corresponds to an area for storing a pointer to the cache management section for managing the cache section managed by the hold cache section pointer 620. Hereinafter, the cache section managed by the hold cache section pointer and the hold cache management pointer is referred to as a hold cache. The hold LBA pointer is for use in connecting hold caches managed by the same cache management section. If any change occurs in the hold cache management, there is a need for a change in the hold LBA pointer. The forward LBA pointer 622 and the backward LBA pointer 623 are for use in connecting the LBA management sections. There is a need for a change in these pointers if any LBA management section is deleted or registered. A single LBA management section manages a single logical block address, as well as a reference cache and a hold cache (a cache holding data withheld from writing into the drive). The reference cache in this embodiment does not update data in the disk. While the hold cache in this embodiment withholds writing into the disk, if data is written into a block absent in the hold cache, the corresponding block is read from the disk, stored into the hold cache, and sent to the computer where the write processing into the block has occurred. It is because data is accessed in units of a block in the computers and the storage system.

Referring to FIG. 10, there is shown a flow of cache reserve processing. In cache management search process 701, a search is carried out to see whether an object cache management section already exists. In step 702, it is determined whether the object cache management section exists. If it already exists, the processing is terminated. If not, the control progresses to cache management section reserve process 703. In the cache management reserve process 703, the cache management section is reserved and initialized. At that time, the hold flag is referenced and set from the control information in the command and then the control progresses to cache section reserve process 704. In the cache section reserve process 704, a cache having a size specified in the command is allocated from the cache area in FIG. 2 and set up in the cache management section.

Figure 11:
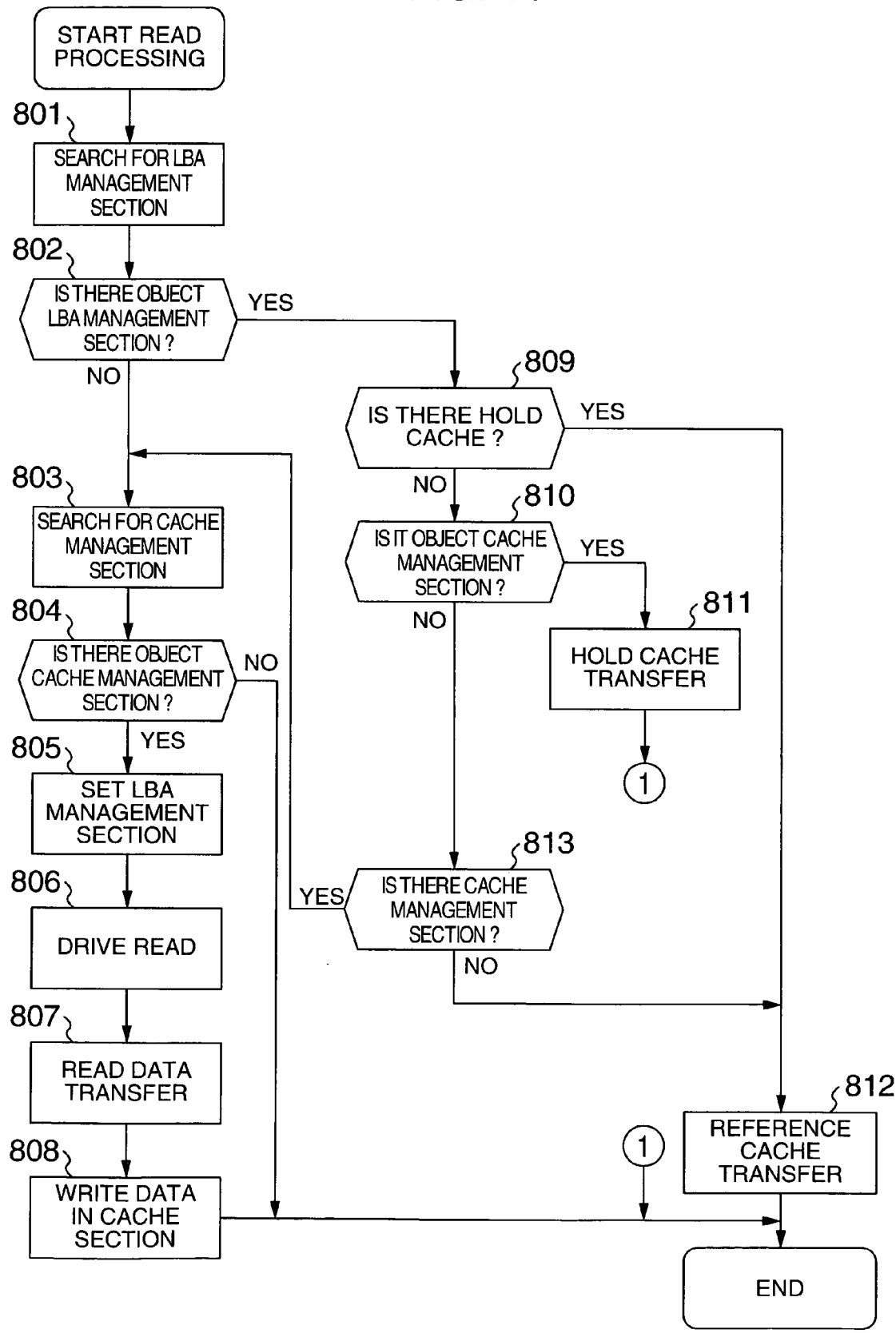
FIG. 11 is a read processing flow.
Figure 12:
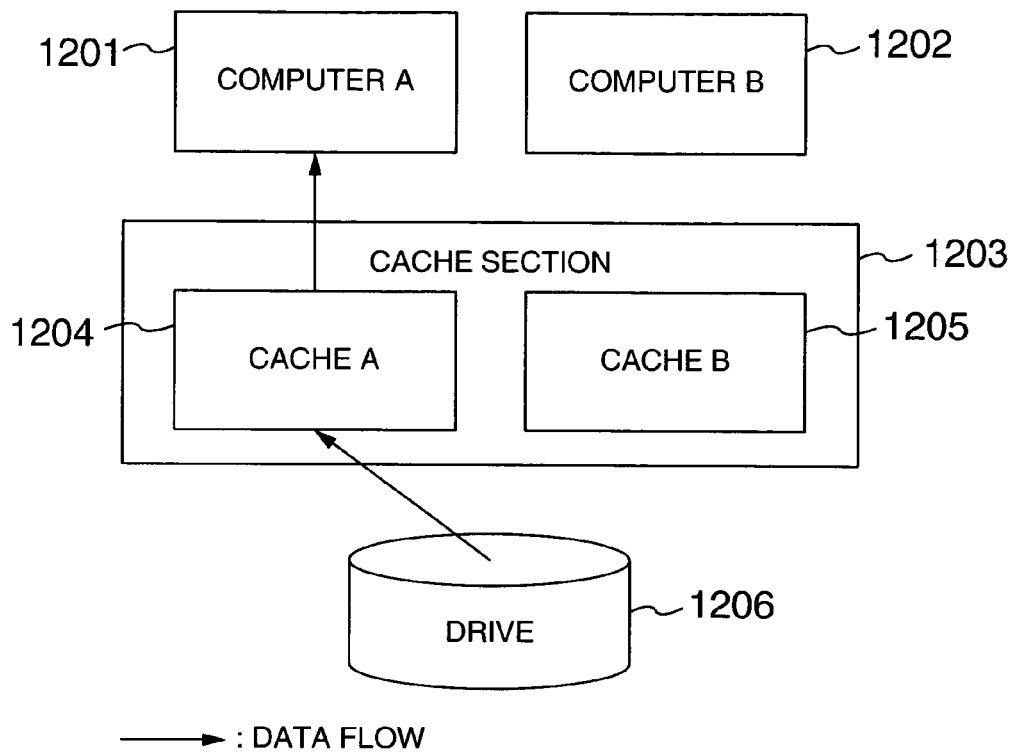
FIG. 12 is a data flow in which data is read from a drive.

Referring to FIG. 11, there is shown a flow of read processing. In LBA management section search process 801, an object LBA management section is searched for. The LBA management section search is carried out by searching for a logical block address (LBA) preset when generating the LBA management section. A result of the search is determined in step 802. If the object LBA management section exists in the step 802, the control progresses to step 809. Unless the object LBA management section exists, it progresses to cache management section search process 803. It is a case where data is read from the drive as shown in FIG. 12. In the cache management section search process 803, a search is carried out to find the cache management section corresponding to a cache identification number appended to the command. Thereafter, the control progresses to step 804. It is determined whether the object cache management section exists in the step 804 and then the control progresses to LBA management section setting process 805. In the LBA management section setting process 805, an object LBA management section for managing data read from a drive 1206 is generated and information on data to be read is stored. If the object LBA management section is already generated, the LBA management section is used and then the control progresses to drive read process 806. Data corresponding to the logical block address is read from the drive in the drive read process 806 and the read data is sent back in read data transfer process 807. In cache section write process 808, the data read from the disk is stored in a cache section 1204 and the cache section is set as a reference cache. Then, the processing ends.

Figure 13:
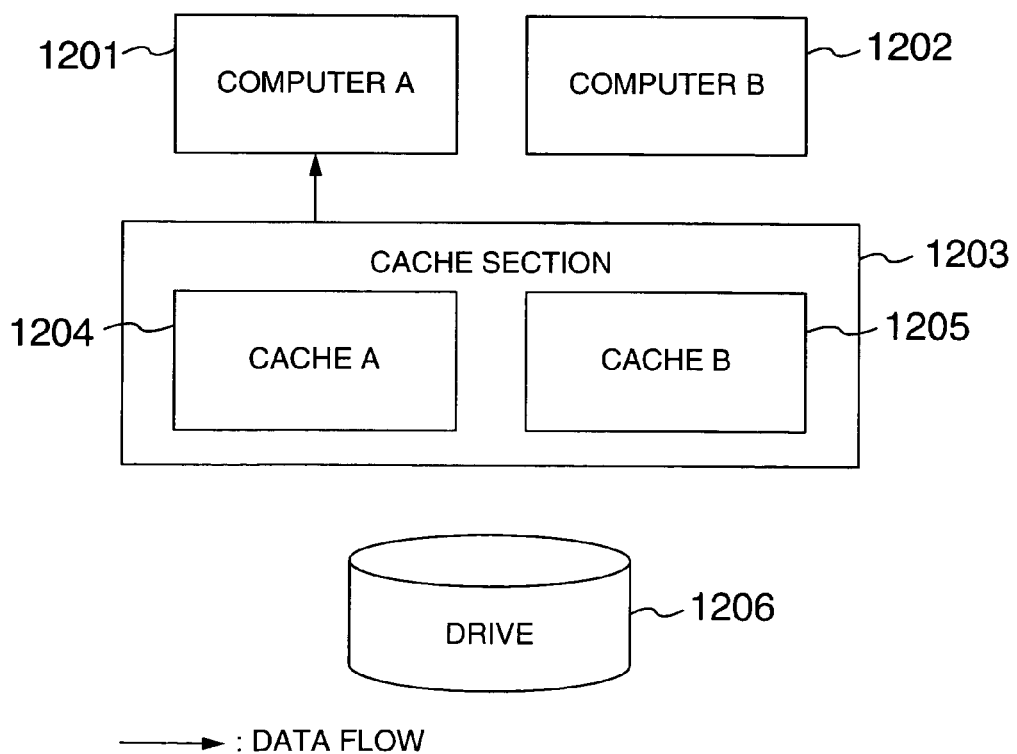
FIG. 13 is a data flow in which data is sent back from a cache (1)
Figure 14:
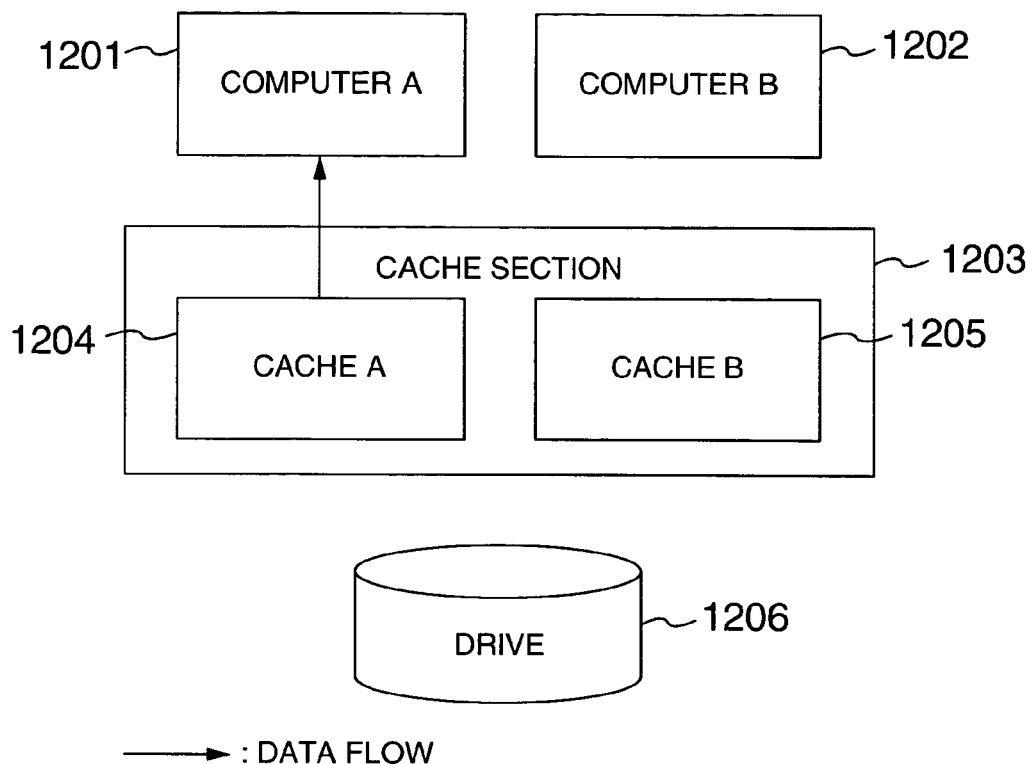
FIG. 14 is a data flow in which data is sent back from a cache (2)

If the LBA management block exists in the step 802 or if data exists in a cache 1203, it is determined whether a hold cache exists in the object LBA management section in the step 809. It is determined by checking that a pointer is set to the hold cache management pointer if a hold cache exists in processing shown by the write processing flow in FIG. 15. Unless the hold cache exists, data in the reference cache is sent back in reference cache transfer process 812, in which data flows as shown in FIG. 13. If a hold cache exists, it is determined whether the cache management section of the hold cache is the same as the object cache management section in step 810. If it is the same, data is sent back from the cache 1204 containing data of the hold cache as shown in FIG. 14. In other words, the held data is sent back in hold cache transfer process 811. Unless the cache management section of the hold cache is the same as the object cache management section, it suggests that a cache 1205 contains a hold cache in FIG. 14. In this condition, the control progresses to step 813. If there is not data read from the drive, namely, a reference cache in the step 813, the control progresses to the cache management search process 803 and data is read from the drive as shown in FIG. 12. If there is the reference cache, data is transferred in the reference cache transfer process 812. Whether the data read from the drive exists is determined by a status of the cache management pointer.

Figure 16:
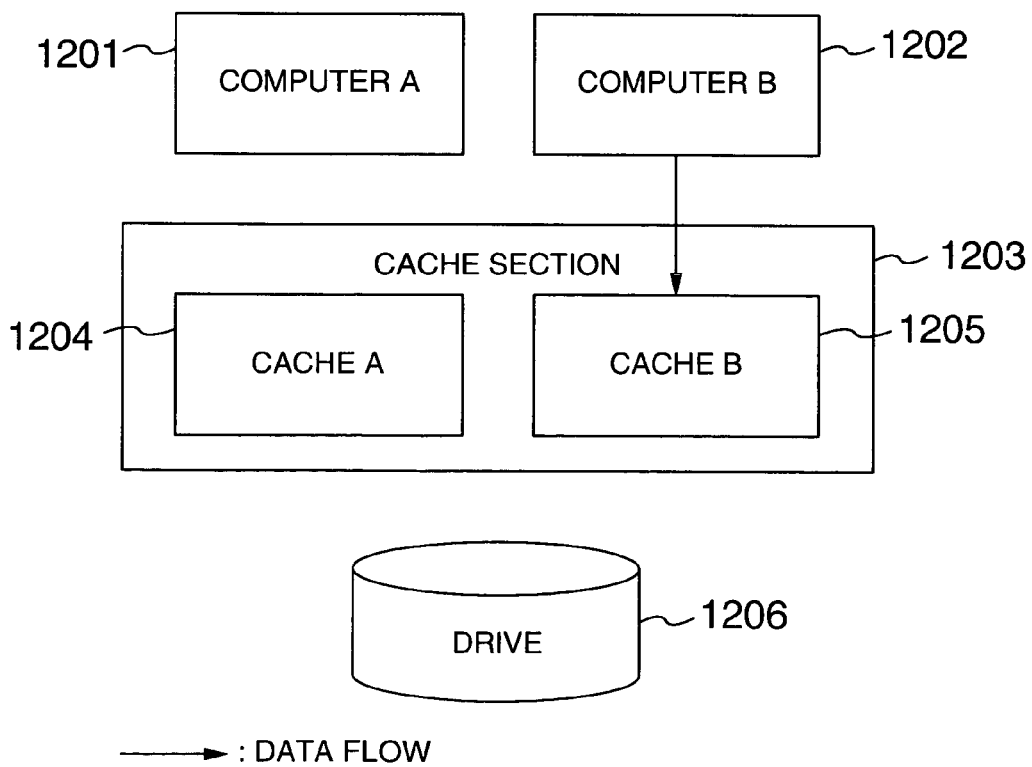
FIG. 16 is a data flow in which write processing into the drive is withheld.
Figure 15:
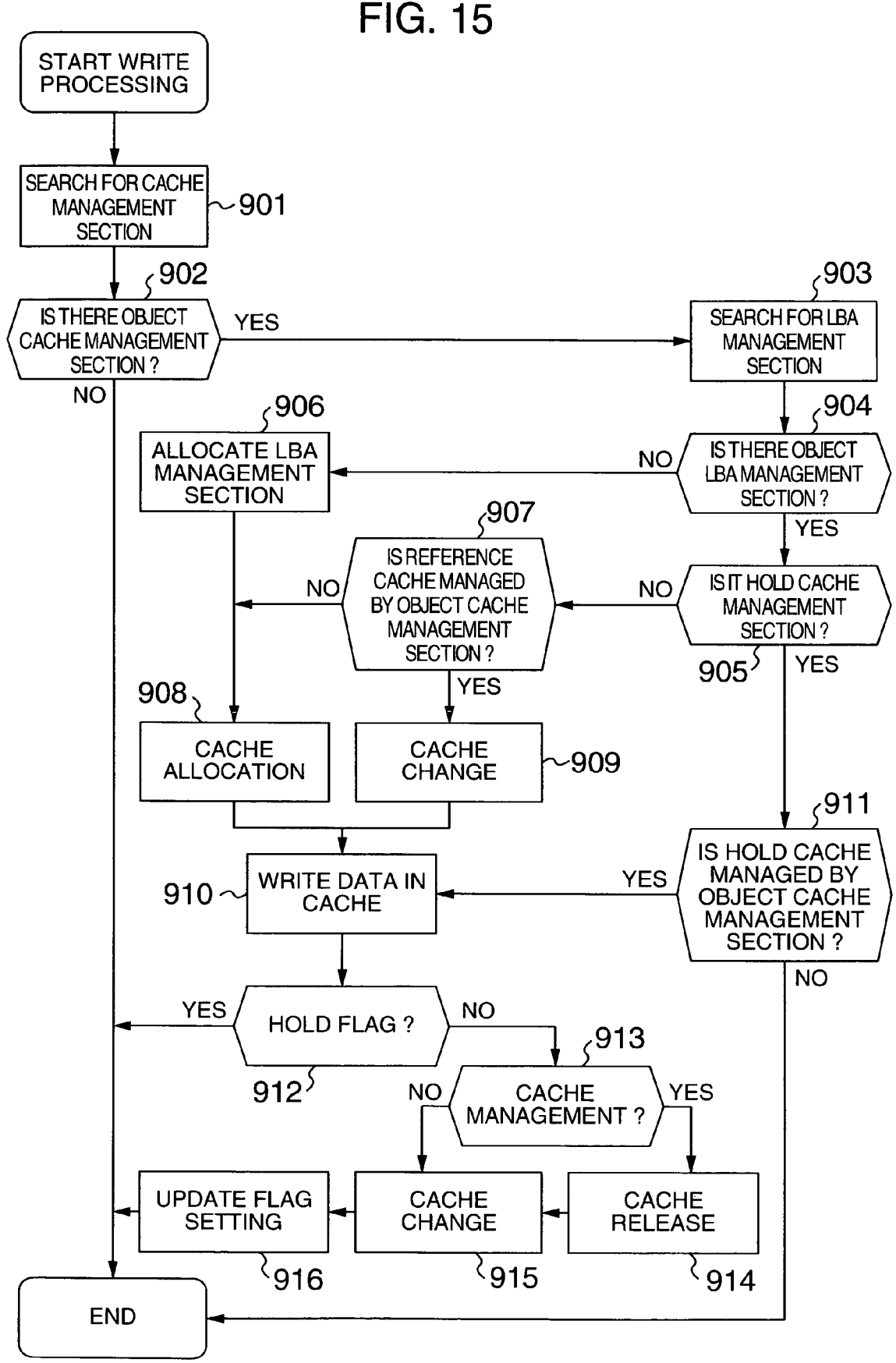
FIG. 15 is a write processing flow.

Referring to FIG. 15, there is shown a write processing flow. In cache management section search process 901, an object cache management section is searched for. The cache management section is searched for by a cache identification number stored at the time of generating the cache management section and a cache identification number appended to the command and a result of the search is determined in step 902. Unless there is any object cache management section in the step 902, the processing is terminated. If there is, the control progresses to LBA management section search process 903. In the LBA management section search process 903, a search is carried out to find an LBA management section managing an object logical block address. In this search process, the logical block address stored at the time of generating the LBA block is compared with the logical block address appended to the command during the search, and a result of the search is determined in step 904. Unless the object LBA management section exists in the step 904, the LBA management block for managing data to be written is reserved in LBA management section allocation process 906. A cache storing written data is allocated from the object cache management block in cache allocation process 908 as a hold cache. Then, the control progresses to cache write process 910, and data is stored in the cache reserved in the cache write process 910. The data stored in the cache is determined from the hold flag set in the cache reserve processing in step 912. If the hold flag indicates that the data should be held, the processing is terminated. In this process, data written from a computer 1202 is stored into a cache 1205 and then the processing is terminated, as shown in FIG. 16. Unless the hold flag indicates that the data should be held, the control progresses to step 913. In the step 913, it is determined whether a reference cache exists. If it exists, the control progresses to cache release process 914. Otherwise, the control progresses to cache change process 915. In the cache release process 914, the reference cache is released and then the control progresses to the cache change process 915. In the cache change process 915, the hold cache is changed to a reference cache and then the control progresses to update flag setting process 916. In the update flag setting process 916, there is set an update flag, which gives an instruction to write data stored in the cache into the drive. Data with this update flag setting is written into the drive when it is replaced from the cache or by means of the writing program periodically executed.

Figure 17:
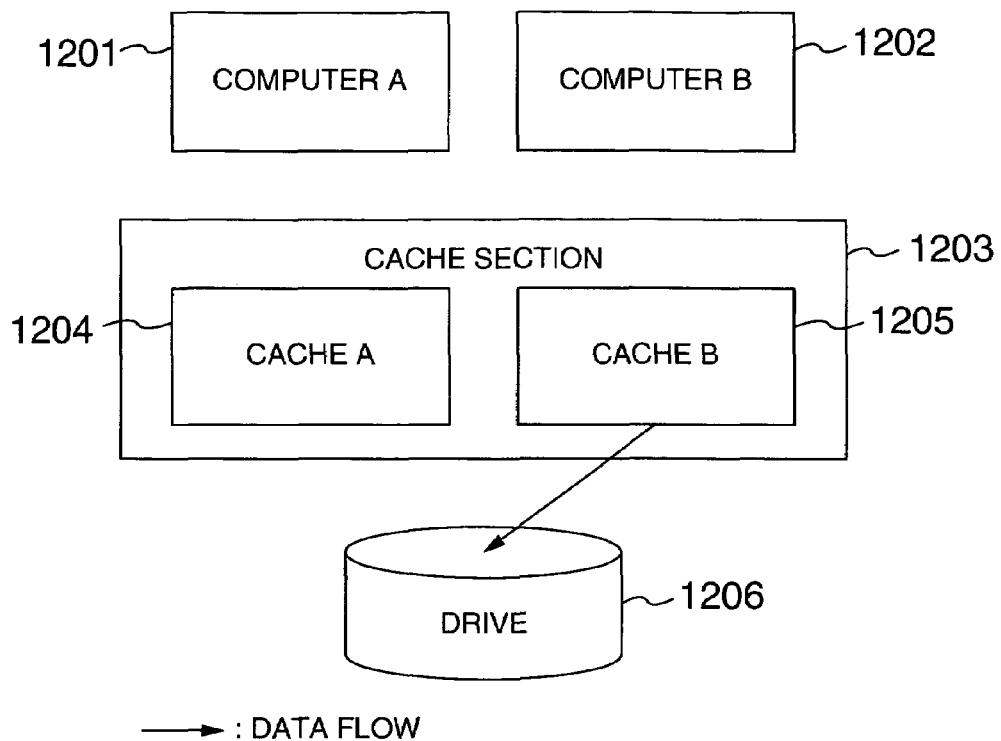
FIG. 17 is a data flow in which data is written from a cache into the drive.

As shown in FIG. 17, if the cache 1205 contains data with the update flag setting, the data stored in the cache 1205 is written into the drive 1206. If the object LBA management section exists in the step 904, it is determined whether a hold cache exists in step 905. If the hold cache exists, the control progresses to step 911. It is determined whether the hold cache is managed by the object cache management section.

Figure 18:
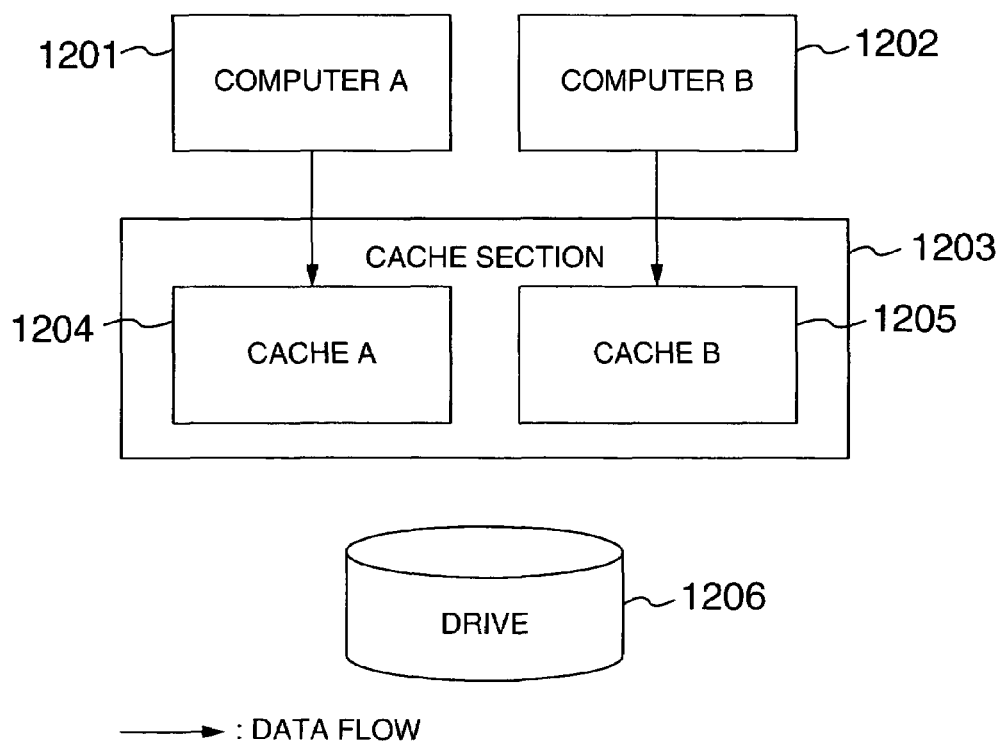
FIG. 18 is a data flow in which data is written at the same address from a plurality of computers.

In this process, it is determined whether data is written at the same logical block address from computers 1201 and 1202 as shown in FIG. 18. If the cache is managed by the object cache management section, the control progresses to cache write process 910 to update data stored in the update cache and to store the data. Unless the hold cache exists in the step 905, the control progresses to step 907. In the step 907, it is determined whether the reference cache is managed by the object cache management section. If it is a cache managed by the object cache management section, the control progresses to cache change process 909. If it is a cache not managed by the object cache management section, the control progresses to cache allocation process 908. In the cache change process 909, a reference cache is changed to a hold cache and then the control progresses to cache write process 910.

Figure 19:
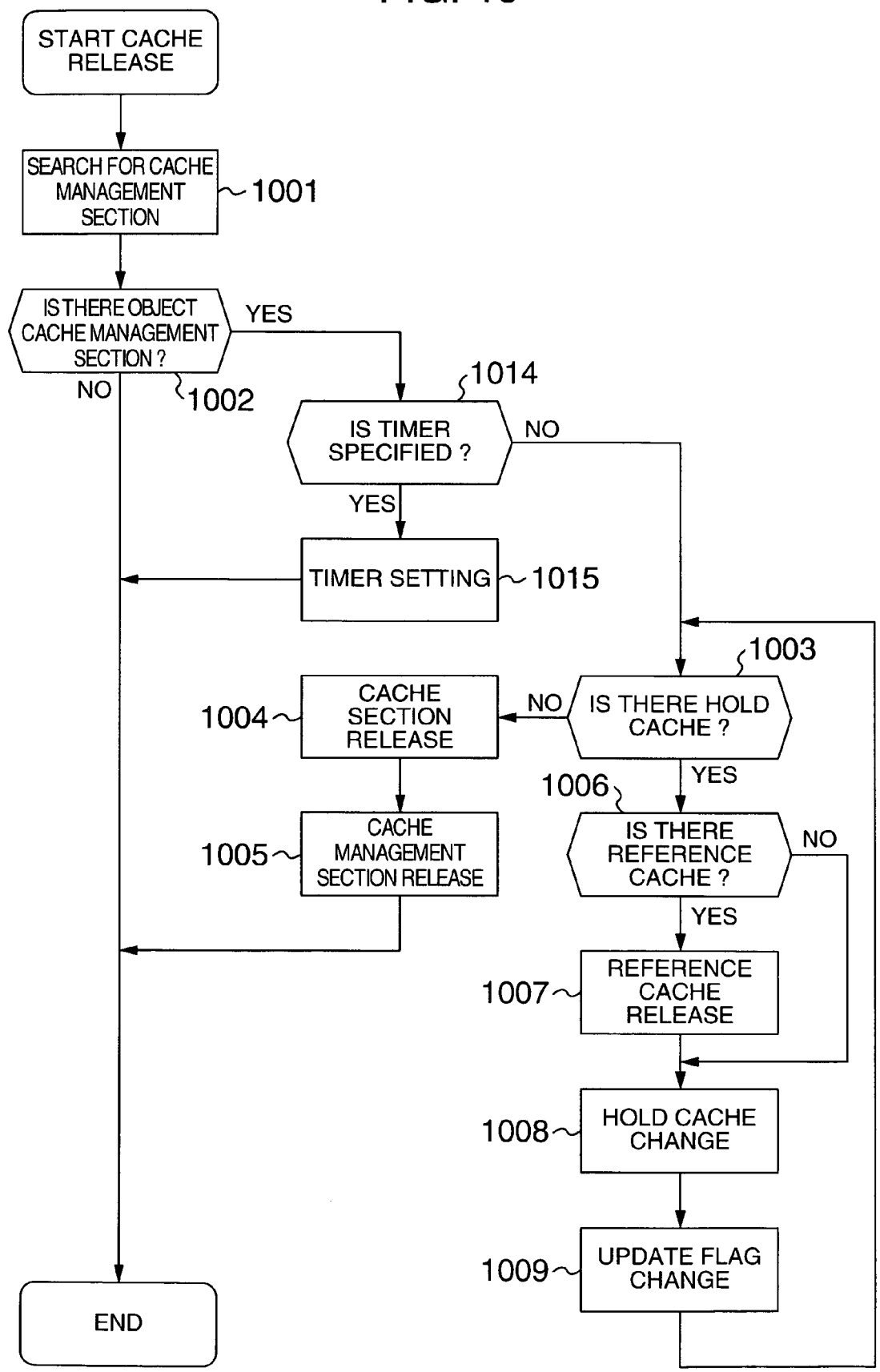
FIG. 19 is a cache release processing flow in which data is reflected in a drive.
Figure 20:
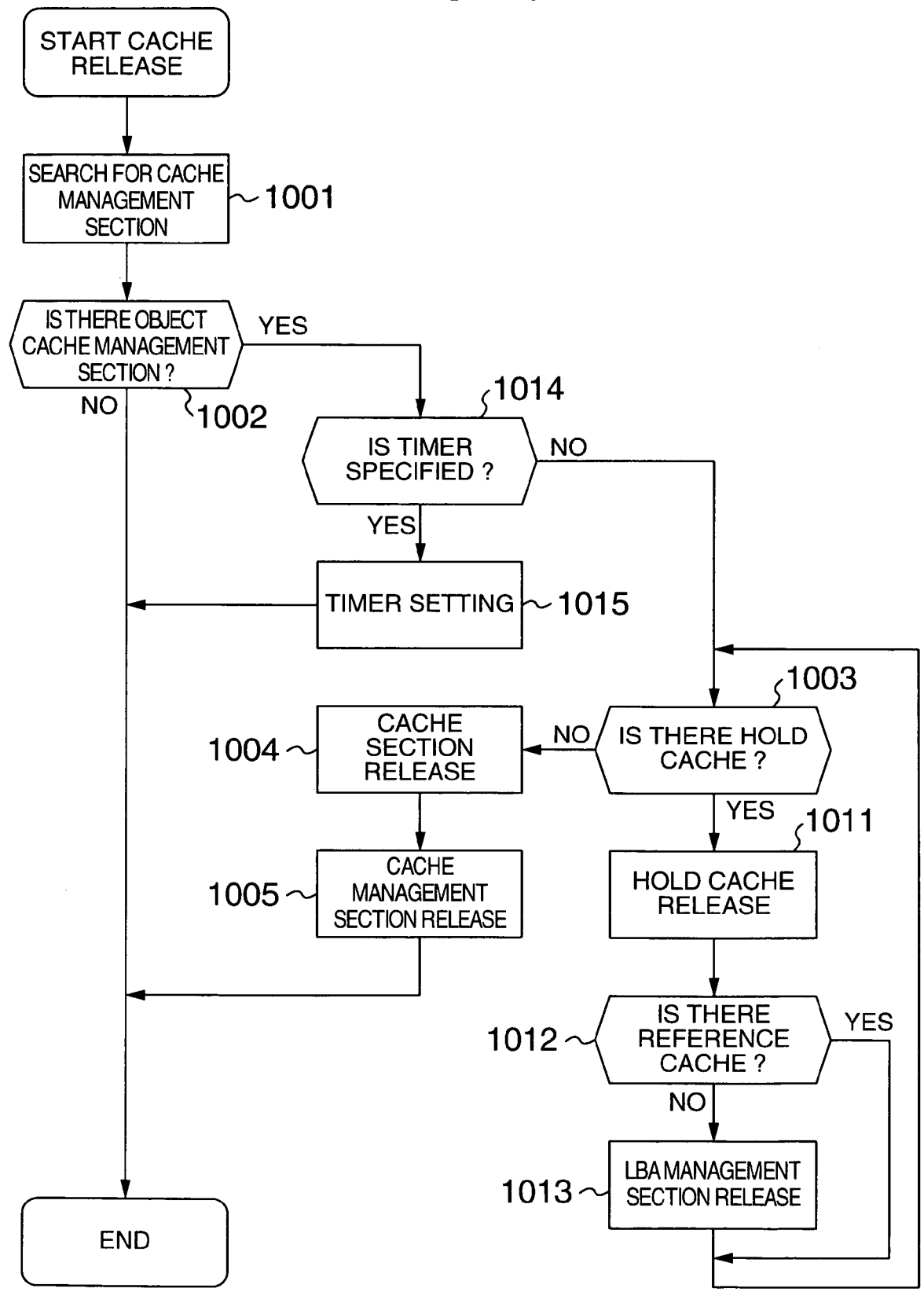
FIG. 20 is a cache release processing flow in which updated data is invalidated.

Referring to FIGS. 19 and 20, there are shown cache release processing flows. If updated data stored in the cache is reflected in the drive according to information of the control 419 shown in FIG. 7, processing of the flow in FIG. 19 is performed. If the updated data stored in the cache is invalidated, processing of the flow in FIG. 20 is performed. In cache management search 1001 in FIG. 19 and FIG. 20, the cache management section for managing the cache to be released is searched for and then the control progresses to step 1002. Unless the object cache management section exists in the step 1002, the processing is terminated. If it exists, the control progresses to step 1014. In the step 1014, it is determined whether the timer 420 shown in FIG. 7 is set.

If the timer is set, the control progresses to timer setting process 1015. In the timer setting process 1015, a timer value and a timer class obtained from the command are set to the timer value and the timer class of the cache management section and the processing is then terminated. Unless the timer is set in the step 1014, the control progresses to step 1013. In the step 1013, it is determined whether there is a hold cache to be connected to the hold LBA pointer. If there is, processing of steps 1006 to 1009 in FIG. 19 or processing of steps 1011 to 1013 is repeated until no hold cache is found anymore. If there is no hold cache or any hold cache is found any more, the control progresses to cache release process 1004. In step 1006 in FIG. 19, it is determined whether a reference cache exists. If the reference cache exists, the control progresses to reference cache release process 1007. Otherwise, it progresses to hold cache change process 1008. In the reference cache release process 1007, the reference cache is released and the control progresses to the hold cache change process 1008. In the hold cache change process 1008, the hold cache is changed to a reference cache and then the control progresses to update flag change process 1009. In the update flag change process 1009, there is set an update flag for writing data of the reference cache into the drive. This causes the data in the reference cache to be written into the drive when it is replaced from the cache or by means of the writing program periodically executed. It is possible to make a plurality of data withheld from writing look as if it were rapidly reflected in the drive in the steps 1003 to 1009.

Figure 21:
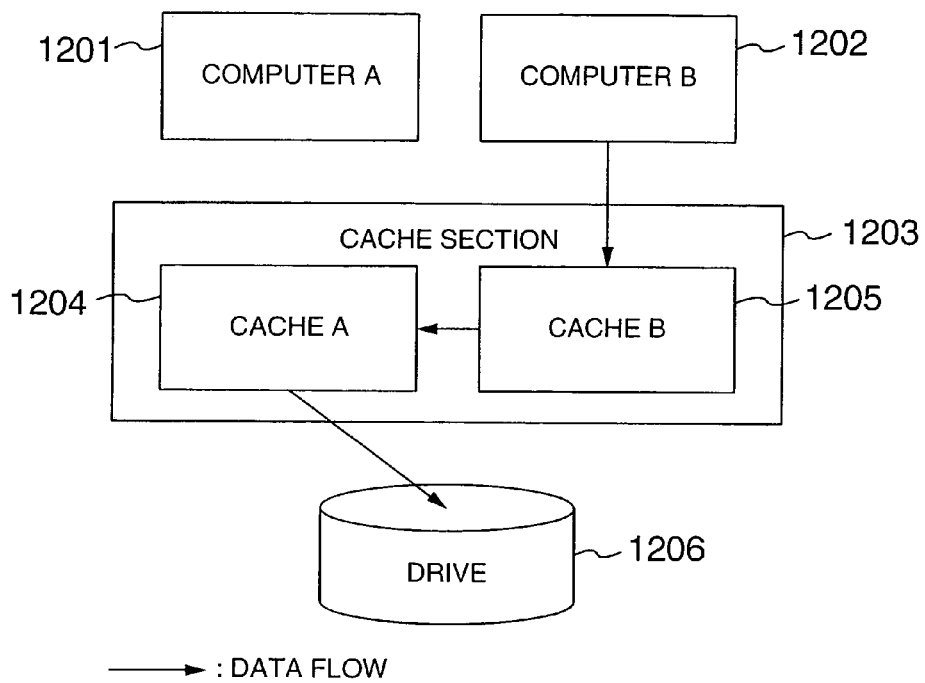
FIG. 21 is a data flow in which data is reflected in the drive.

More specifically, as shown in FIG. 21, if data is written from the computer 1202 at the same address as for the computer 1201 (the same positional information in the storage system), the data is stored into the cache 1205. During execution of release processing of the cache 1205, the reference cache data in the cache 1204 is replaced (overwritten) with the updated data in the cache 1205 or the updated data is added to the reference cache. The data is then written from the cache 1204 to the drive.

In the steps of 1011 to 1013 in FIG. 20, data withheld from writing is released without being written into the drive in the hold cache release 1011 and then the control progresses to the step 1012. In the step 1012, it is determined whether any reference cache exists. Unless it exists, the control progresses to the LBA management section release process 1013. In the LBA management section release process 1013, the LBA management section is released. In the steps 1003 and 1011 to 1013, the data written into the drive is returned to its original state, and thereby it is possible to make the data written into the drive look as if it were completely returned rapidly. After the end of the step 1003 in FIG. 19 and FIG. 20, the control progresses to cache section release process 1004. In the cache section release process 1004, the cache section managed by the cache management section is released and then the control progresses to cache management section release process 1005. In the cache management section release process 1005, the cache management section is released and the processing is terminated. It is performed on the assumption that, for example, the computer A 1201 executes online processing with reference to a database stored in the drive 1206. The computer B 1202 is assumed to execute batch processing with reference to the database and to store a result of the execution into the cache B 1205.

After the end of the batch processing, the storage system 103 copies a result of the batch processing of the cache B 1205 into the cache A 1204 in response to a merge request from the computer B 1202. This causes the result of the batch processing to be reflected in the database. A DB-disk block conversion table 219 in FIG. 2 is a table in which logical locations of blocks in a database storage area are associated with physical locations of blocks in the storage system. In an input to the computer B 1202, the cache B is used to read the database and a result of the processing is stored in the cache B. During the batch processing (until the batch processing result stored in the cache B is reflected in the cache A), it is inhibited to perform an output to the database, namely write processing into the disk storing the database. It avoids an occurrence of updating in the database during the batch processing. By using the DB-disk block conversion table 219 in FIG. 2, the batch processing result from the computer B 1202 is written into the cache B 1205 as a logical block of the database and a logical block address indicating the storage location in the database is converted to a physical block address indicating the storage location in the disk, by which the data can be merged into the cache A 1204 as an update for the database.

Figure 22:
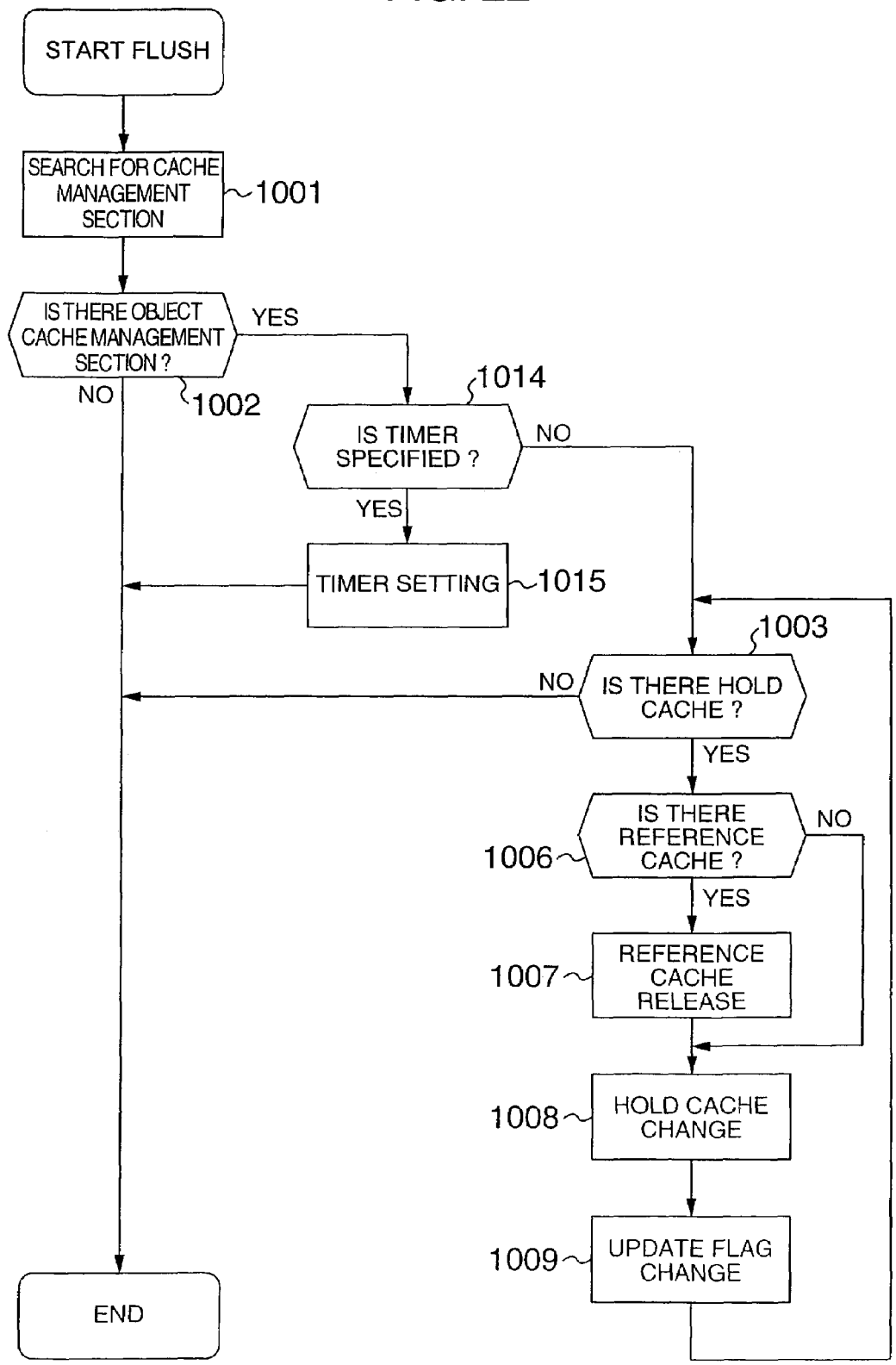
FIG. 22 is a flush processing flow in which data is reflected in the drive.
Figure 23:
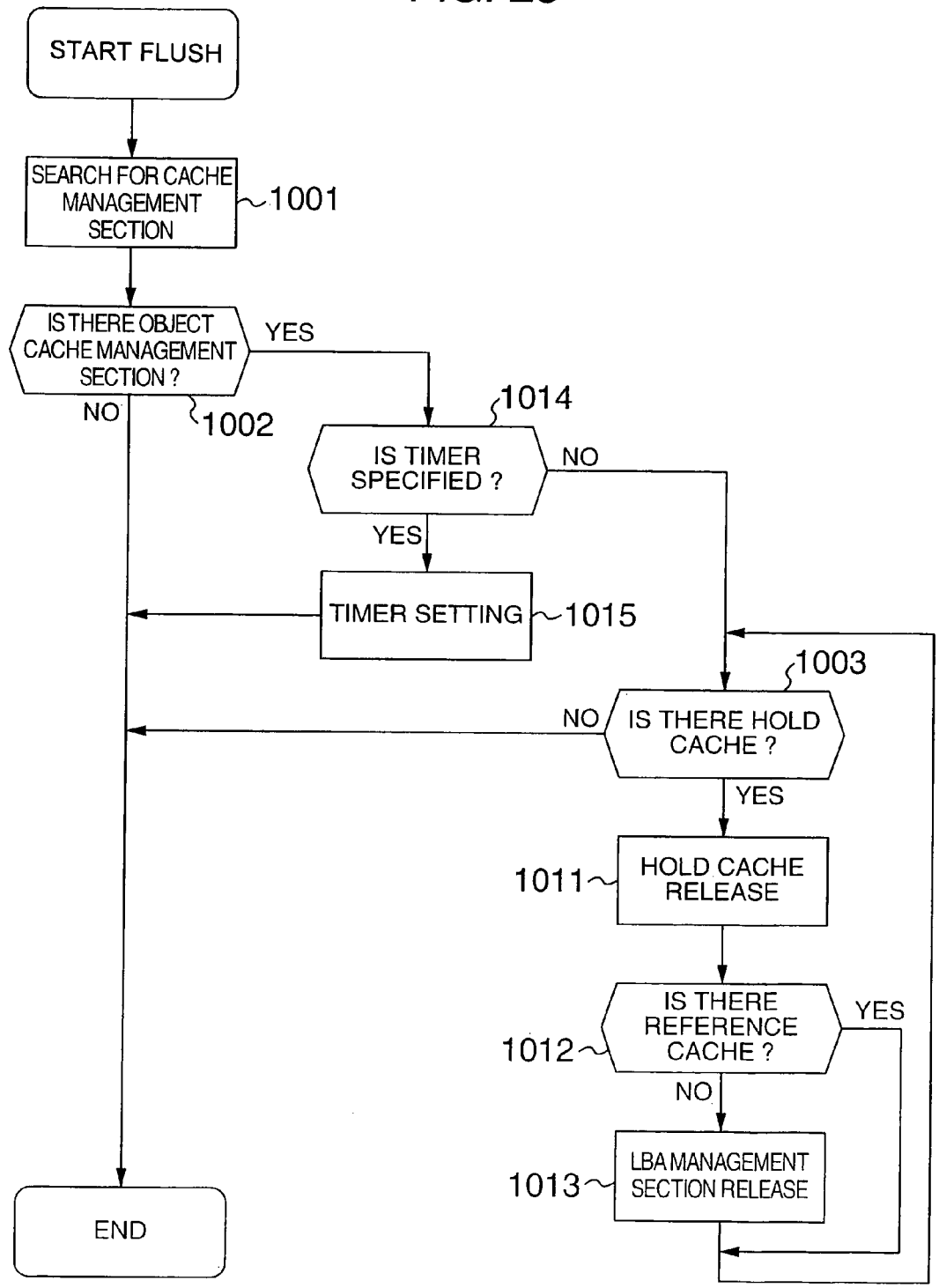
FIG. 23 is a flush processing flow in which updated data is invalidated.

Referring to FIG. 22 and FIG. 23, there are shown flush processing flows. If updated data stored in the cache is reflected in the drive according to information of the control 424 shown in FIG. 24, the flow processing in FIG. 22 is performed. If the updated data stored in the cache is invalidated, the flow processing in FIG. 23 is performed. In cache management section search process 1001 in FIG. 22 and FIG. 23, a search is carried out to find a cache management section for managing a cache to be released, and then the control progresses to step 1002. In the step 1002, the processing is terminated unless an object cache management section exists or the control progresses to step 1014 if the object cache management section exists. In the step 1014, it is determined whether a timer 425 in FIG. 24 is set. If the timer is set, the control progresses to timer setting process 1015. In the timer setting process 1015, a timer value and a timer class obtained from the command are set to the timer value and the timer class of the cache management section. Thereafter, the processing is terminated. Unless the timer is set in the step 1014, the control progresses to step 1013. In the step 1013, it is determined whether there is a hold cache to be connected to the hold LBA pointer. If there is, processing of steps 1006 to 1009 in FIG. 22 or processing of steps 1011 to 1013 in FIG. 23 is repeated until no hold cache is found anymore. If there is no hold cache or no hold cache is found anymore, the processing is terminated.

In the step 1006 in FIG. 22, it is determined whether a reference cache exists. If it exists, the control progresses to reference cache release process 1007. Otherwise, it progresses to hold cache change process 1008. In the reference cache release process 1007, the reference cache is released and then the control progresses to the hold cache change process 1008. In the hold cache change process 1008, the hold cache is changed to a reference cache and then the control progresses to update flag change process 1009. In the update flag change process 1009, there is set an update flag for writing data of the reference cache into the drive. This causes the data of the reference cache to be written into the drive at cache replacement or by the writing program periodically executed. It is possible to make a plurality of data withheld from writing look as if it were rapidly reflected in the drive in the steps 1003 to 1009. More specifically, as shown in FIG. 21, if data is written from the computer 1202 at the same address as for the computer 1201 (the same positional information in the storage system), the data is stored into the cache 1205. During execution of release processing of the cache 1205, the reference cache data in the cache 1204 is replaced (overwritten) with the updated data in the cache 1205 or the updated data is added to the reference cache. The data is then written from the cache 1204 to the drive.

In the steps of 1011 to 1013 in FIG. 20, data withheld from writing is released without being written into the drive in the hold cache release process 1011 and then the control progresses to the step 1012. In the step 1012, it is determined whether a reference cache exists. Unless it exists, the control progresses to the LBA management section release process 1013. In the LBA management section release process 1013, the LBA management section is released. In the steps 1003 and 1011 to 1013, the data written into the drive is returned to its original state, and thereby it is possible to make the data written into the drive look as if it were completely returned rapidly. After the end of the step 1003 in FIG. 22 and FIG. 23, the processing is terminated.

Figure 25:
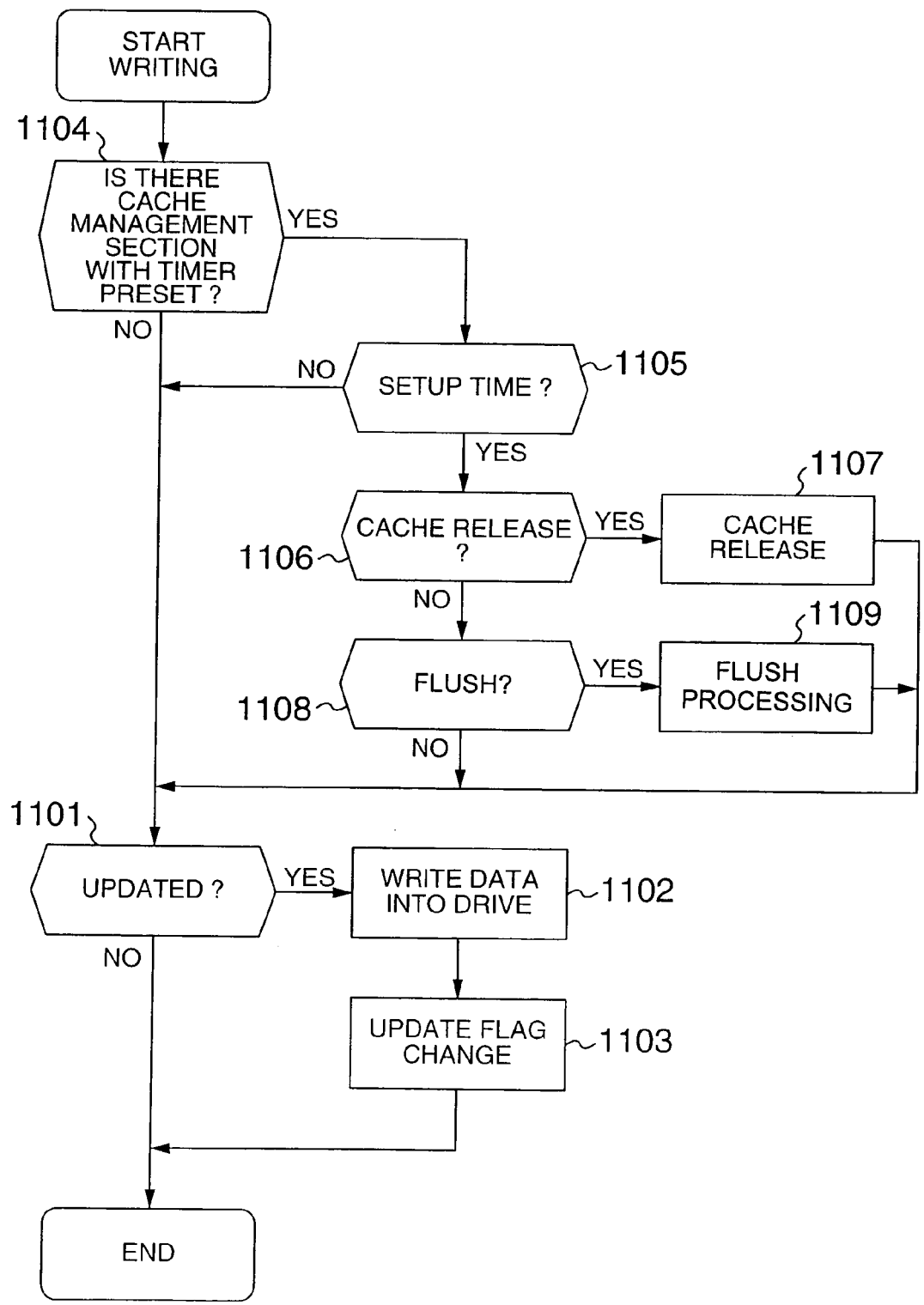
FIG. 25 is a flow of a writing program.

Referring to FIG. 25, there is shown a flow of the writing program executed at the replacement of data in the cache section managed by the cache management section and the LBA management section from the cache or executed periodically. In step 1104, it is determined whether there is a cache management section in which a timer value is preset. If there is, the control progresses to step 1105. Otherwise, it progresses to step 1101. In the step 1105, it is determined whether the preset timer has reached the setup time. If it has reached the setup time, the control progresses to step 1106. Otherwise, it progresses to step 1101. In the step 1106, a timer class is determined. If it is a cache release, the control progresses to cache release process 1107. Otherwise, it progresses to step 1108. In the cache release process 1107, a cache release in FIG. 19 or FIG. 20 is performed, without specifying the timer value in the command. Thereby, it is considered that the data has been written into the drive at the specified time. In the step 1108, it is determined whether the timer class is flush.

If the timer class is flush, the control progresses to flush processing 1109. Otherwise, it progresses to step 1101. In the flush process 1109, the flush processing in FIG. 22 or FIG. 23 is performed, without specifying the timer value in the command. In the step 1101, it is determined whether the reference cache is updated. The determination is made with reference to the status of the update flag. If it is not updated, the processing is terminated. If it is updated, the control progresses to drive writing process 1102. In the drive writing process 1102, the data of the reference cache is written into the drive and then the control progresses to update flag change process 1103. In the update flag change process 1103, the update flag is initialized and then the processing is terminated. As shown in FIG. 17, data in the cache section 1203 is written into the drive 1206. If data is replaced from the cache, the processing starts at the step 1101.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A cache control method in a data processing system comprising a storage apparatus and computers which executes a first program and a second program, the storage apparatus having a cache memory with a first area and a second area and a disk unit which stores data of the cache memory, the method comprising the steps of:

writing data into the first area of the cache memory corresponding to area identification information included in a data storage request generated by executing the first program in response to an input of the data storage request, the data storage request comprising the area identification information for identifying the first area;

writing the data into the second area of the cache memory corresponding to area identification information included in a data storage request generated by executing the second program in response to an input of the data storage request, the data storage request comprising the area identification information for identifying the second area; and copying the data stored in the second area of the cache memory to the first area of the cache memory in response to an input of a copy request for causing the data in the second area of the cache memory to be reflected in the first area of the cache memory.

2. The method according to claim 1, further comprising the step of:

disabling storing data into the first area when the data stored in the second area is copied to the first area.

3. The method according to claim 1, further comprising the step of:

disabling flushing the data stored in the second area into said disk unit.

4. The method according to claim 2, further comprising the step of:

canceling the first disabling of storing data after an end of the copy processing of the data in the second area to the first area.

5. The method according to claim 1, further comprising the step of:

reading data from a cache for an identification number in a received command.

6. The method according to claim 1, further comprising the step of:

copying the data in the second area so as to be associated with the data in the first area with reference to an area correspondence table when copying the data in the second area to the first area, with the storage device further comprising the area correspondence table indicating logical correspondence between the first area and the second area.

7. The method according to claim 6, further comprising the step of:

associating logical positional information of a database with physical positional information in the area correspondence table indicating the logical correspondence between the first area and the second area.

8. A data processing system comprising a storage apparatus and computers which executes a first program and a second program, the storage apparatus having a cache memory with a first area and a second area and a disk unit which stores data of the cache memory, the data processing system comprising:

means which writes data into the first area of the cache memory corresponding to area identification information included in a data storage request generated by executing the first program in response to an input of the data storage request, the data storage request comprising the area identification information for identifying the first area;

means which writes the data into the second area of the cache memory corresponding to area identification information included in a data storage request generated by executing the second program in response to an input of the data storage request, the data storage request comprising the area identification information for identifying the second area; and means which copies the data stored in the second area of the cache memory to the first area of the cache memory in response to an input of a copy request for causing the data in the second area of the cache memory to be reflected in the first area of the cache memory.

9. The system according to claim 8, wherein storing data into the first area is disabled when the data stored in the second area is copied to the first area.

10. The system according to claim 8, wherein the data stored in the second area is not flushed into said disk unit.

11. The system according to claim 9, wherein the first disabling of storing data is canceled after an end of the copy processing of the data in the second area to the first area.

12. The system according to claim 8, wherein data is read from a cache for an identification number in a received command.

13. The system according to claim 8, wherein the data in the second area is copied so as to be associated with the data in the first area with reference to an area correspondence table when the data in the second area is copied to the first area, with the storage apparatus further comprising the area correspondence table indicating logical correspondence between the first area and the second area.

14. A data processing program which operates a data processing system comprising a storage apparatus and computers for executing a first program and a second program, the storage apparatus having a cache memory with a first area and a second area and a disk unit for storing data of the cache memory, the data processing program comprising the steps of:

writing data into the first area of the cache memory corresponding to area identification information included in a data storage request generated by executing the first program in response to an input of the data storage request, the data storage request comprising the area identification information for identifying the first area;

writing the data into the second area of the cache memory corresponding to area identification information included in a data storage request generated by executing the second program in response to an input of the data storage request, the data storage request comprising the area identification information for identifying the second area; and copying the data stored in the second area of the cache memory to the first area of the cache memory in response to an input of a copy request for causing the data in the second area of the cache memory to be reflected in the first area of the cache memory.

* * * * *